United States Patent [19]
Miki

[11] Patent Number: 5,285,863
[45] Date of Patent: Feb. 15, 1994

[54] ENGINE COMPARTMENT OF A FORK-LIFT TRUCK

[75] Inventor: Osamu Miki, Kariya, Japan

[73] Assignee: Kabushiki Kaisha Toyoda Jidoshokki Seisakusho, Kariya, Japan

[21] Appl. No.: 819,383

[22] Filed: Jan. 10, 1992

[30] Foreign Application Priority Data

Jan. 10, 1991 [JP] Japan ................ 3-13886

[51] Int. Cl.⁵ .................................. B60K 11/06
[52] U.S. Cl. ........................................ 180/68.2
[58] Field of Search ............. 180/68.1, 68.2, 68.3, 180/68.4, 68.6; 280/43.12; 123/41.65, 41.66, 41.7

[56] References Cited

U.S. PATENT DOCUMENTS 2,114,156  4/1938  Towson .
4,744,432  5/1988  Shibata ................ 180/68.1

FOREIGN PATENT DOCUMENTS 2931704  2/1981  Fed. Rep. of Germany .
2934095  3/1981  Fed. Rep. of Germany .
1454351  9/1966  France .
52-101530  8/1977  Japan .
53-127420  10/1978  Japan .
56-87983  7/1981  Japan .
62-89501  6/1987  Japan .
1-78698  5/1989  Japan .
1-126399  8/1989  Japan .
2-33134  3/1990  Japan .
2-144228  6/1990  Japan .
2-88826  7/1990  Japan .

*Primary Examiner*—Richard M. Camby
*Attorney, Agent, or Firm*—Brooks Haidt Haffner & Delahunty

[57] ABSTRACT

An engine compartment of a fork-lift truck has a noise-proof bottom plate for shielding the compartment bottom, and lateral intake air ports and passages for admitting outside air to the engine compartment, the incoming air being drawn over the walls of an hydraulic working oil tank mounted adjacent to the engine compartment, to continuously cool the oil within the tank. Introduction of the air through intake ports formed in the side of the truck body prevents entry of dust, splashing water and the like from the ground beneath the truck. The noise-proof bottom plate also serves to suppress noise emissions from the engine. A variety of air intake passage arrangements are described.

21 Claims, 17 Drawing Sheets

ENGINE COMPARTMENT OF A FORK-LIFT TRUCK

BACKGROUND OF THE INVENTION

1. Field of the Invention

The present invention relates to a structure for introducing outside air into an engine compartment of a fork-lift truck such as a diesel or gasoline powered industrial vehicle.

2. Description of the Related Art

Conventional fork-lift trucks are so constructed as to have an engine compartment 90 for housing an engine 91, a radiator 92, and the like as shown in FIGS. 20 and 21.

The conventional engine compartment 90 of a fork-lift truck is open at its bottom. An oil tank 96 and a fuel tank 97 are disposed at opposite sides of the engine compartment 90, so as to enclose the engine compartment 90. As FIG. 22 shows, since an open step 9420 is formed in the frame 942 of a vehicle body side, the oil tank 96 has a notch which defines a recessed area 960 serving as a portion of the open step 9420.

As FIGS. 20 and 21 show, a hood 93 covers over the upper part of the engine compartment 90. The frame 942 and a weight 95 cover the front and rear parts of the engine compartment 90, respectively.

As FIG. 20 shows, the weight 95 is provided with an exhaust port 950 through which outside air 8 introduced at the bottom into the engine compartment 90 is exhausted rearward. The flow of the outside air 8 is caused by a cooling fan 910 which is rotatably mounted on the engine 91, resulting in cooling the radiator 92, and the like.

Reference numeral 99 in FIG. 20 designates a rear wheel of the fork-lift truck. Reference numeral 930 in FIG. 21 designates a noise-proof seal. Reference numeral 98 in FIGS. 20 and 21 designates a head guard which is integrally formed with a frame of the oil tank 96, and the like.

The oil tank 96 is filled with working hydraulic oil 961 for power transmission for cargo working operations of the fork-lift truck.

In the aforementioned engine compartment of the conventional fork-lift truck, the oil tank 96 cannot be sufficiently cooled. The bottom part of the engine compartment 90 is conventionally left open to introduce the outside air 8 through the bottom for cooling the radiator. Overheating of the working oil 961 has occurred in this type of fork-lift truck. Additional oil coolers can be provided to cope with this problem of overheating, but that adds to the cost of the truck. The pipe arrangement has to be elongated for such additional oil coolers, resulting in increasing flow resistance and causing other problems.

Since the fork-lift truck is constructed to introduce the outside air 8 from the bottom part of the engine compartment 90 as FIG. 21 shows, a vortex 81 is likely to occur over the oil tank 96 and the fuel tank 97. This will promote the accumulation of dust 82, such as sand taken up from the ground, on upper surfaces of both tanks 96 and 97. Moreover, noise easiy carries from the bottom part of the engine compartment 90.

SUMMARY OF THE INVENTION

It is an object of the present invention to provide an engine compartment of a fork-lift truck with means for sufficiently cooling an adjacent oil tank with a flow of outside air, requiring no further oil cooler, and for preventing dust, splashing water and the like from entering the engine compartment, and for baffling noise emissions from the engine.

Generally the objects of the invention are achieved in a fork-lift truck having an engine compartment housed within its body frame and provided with an oil tank at a side of the compartment by providing a noise-proof bottom plate which seals the bottom part of the engine compartment, but having a laterally directed air passage extending into the engine compartment through which the outside air is introduced into the engine compartment, the air passage being disposed along a wall surface of the oil tank so that the entering air cools the tank.

Other features and advantages of this invention will be apparent from the following description and the accompanying drawings.

DETAILED DESCRIPTION OF THE INVENTION

The most salient feature of the present invention is to substantially seal the engine compartment by providing the bottom part thereof with a noise-proof bottom plate, and to take in the outside air from the side of the truck body and into the engine compartment through an air passage formed laterally through the side of the truck body and along the wall surface of the oil tank so as to cool the latter.

Figure 1:
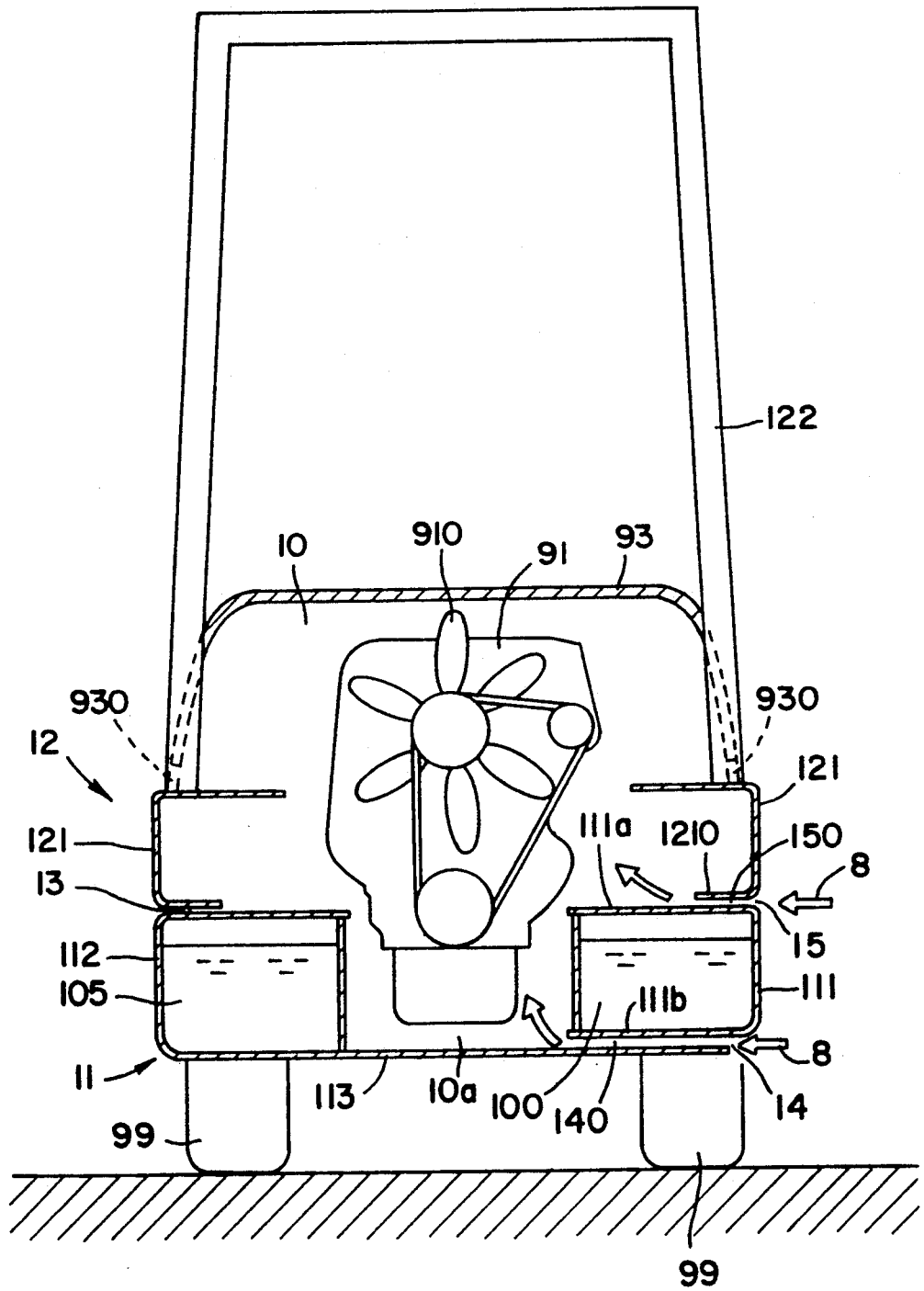
FIG. 1 is a sectional rear elevational view of an engine compartment of the fork-lift truck in accordance with a first embodiment of the invention, the view being taken along a line I—I of FIG. 3 and looking in the direction of the arrows.
Figure 4:
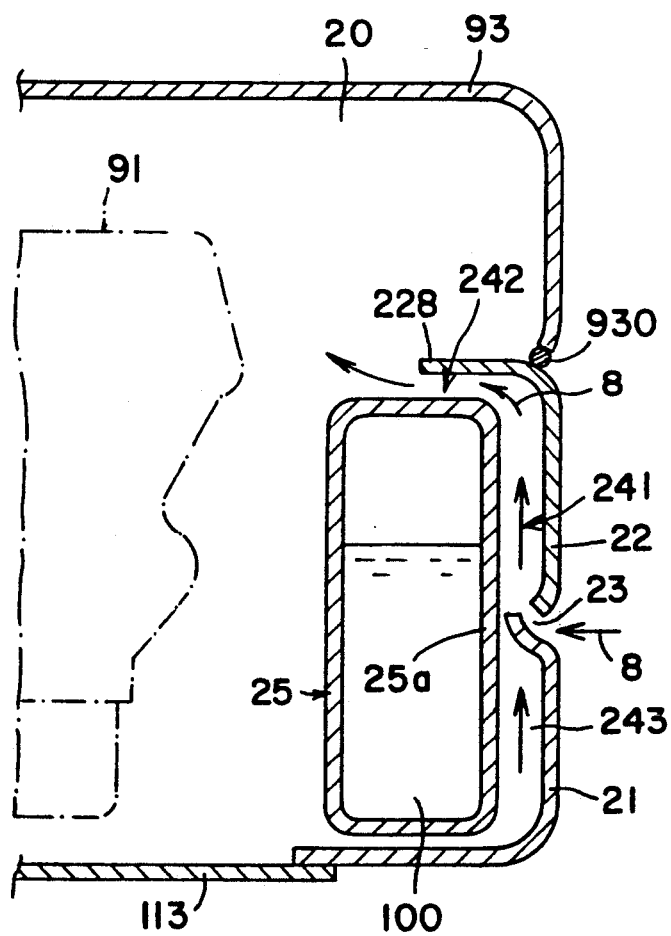
FIG. 4 is an enlarged fragmentary sectional rear elevational view showing a detail of the engine compartment in accordance with a second embodiment of the invention.

The air passage may be formed along the upper and lower wall surfaces of the oil tank by disposing air intake passages at those places, as shown in FIG. 1. Alternatively, the air passage may be formed between the oil tank and a vertical side panel which covers the outer side of the oil tank as shown in FIG. 4.

It is preferable that the oil tank be elongated in the horizontal direction instead of the vertical direction. This will eliminate the necessity for providing any recessed portion of the tank which would otherwise be required to form an open step for the operator, and decrease the tank capacity.

Figure 5:
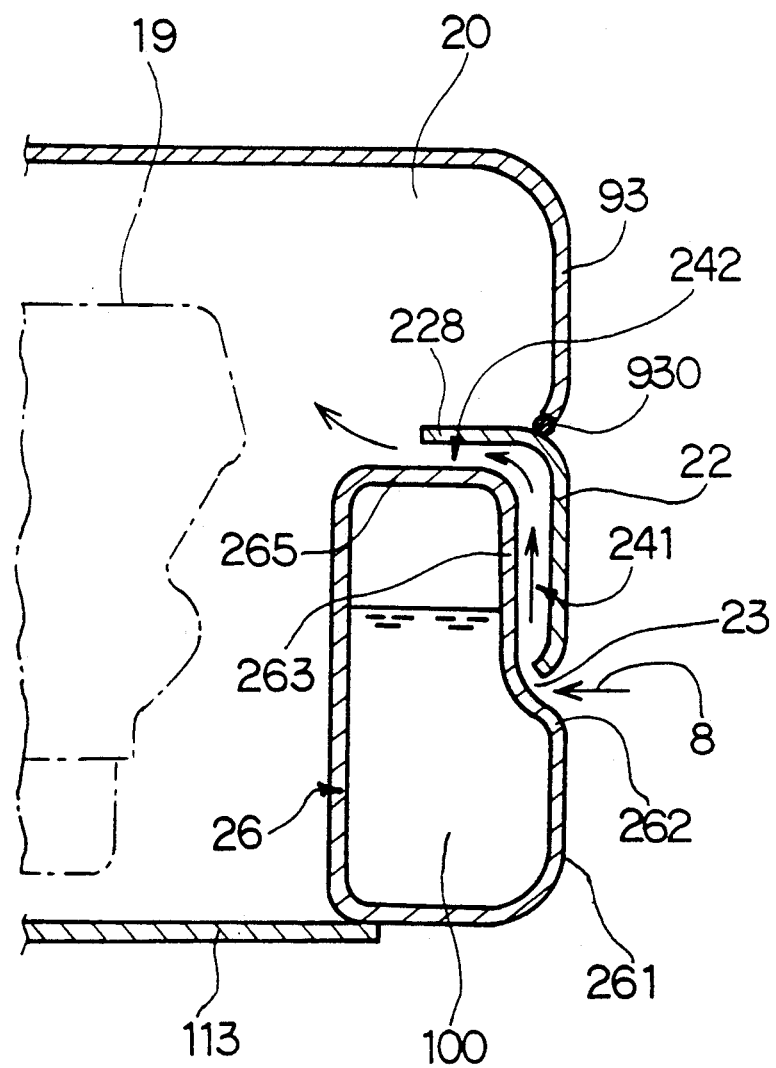
FIG. 5 is a similar fragmentary sectional rear elevational view showing a detail of the engine compartment provided with a third embodiment of the invention.

The side wall of the oil tank preferably forms a part of the vehicle body frame as shown in FIGS. 1 and 5, by which the cooling effect of outside air on the oil tank is further improved.

The air passage is preferably formed between the wall surface of the oil tank and the body panel The body panel is preferably corrugated, by which the noise from the engine compartment is further reduced.

The body panel is preferably formed of a synthetic resin to reduce vibration of the body panel, and which also permits wide latitude in body color selection because of the numerous colors in which resins are made.

Figure 8:
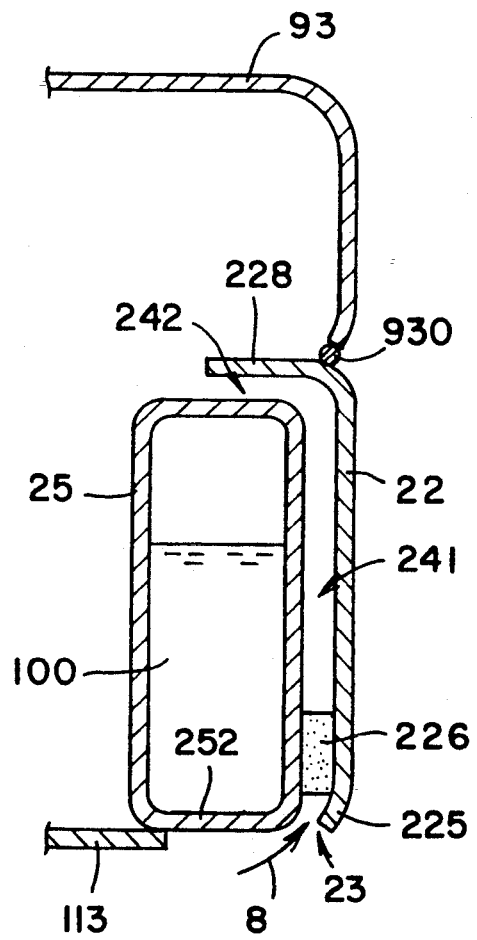
FIG. 8 is a fragmentary rear sectional view showing a detail of the engine compartment having a fifth embodiment of the invention.

As FIG. 8 shows, the body panel may be elongated downwardly to the lower part of the oil tank, parallel to and spaced laterally from the sidewall surface thereof, to provide a vertical air passage therebetween. This improves the cooling effect on the oil tank due to the elongated vertical air passage between the body panel and the oil tank which exposes more surface area of the tank to the incoming cool air.

Figure 9:
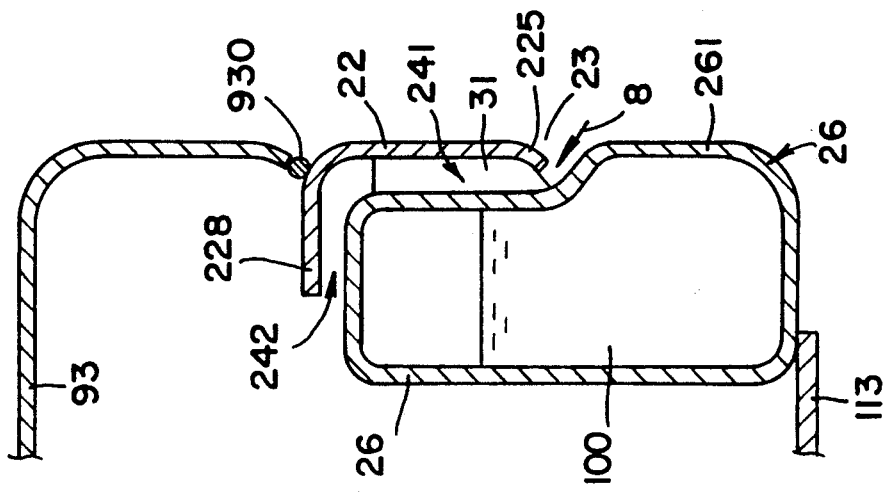
FIG. 9 is a similar fragmentary rear sectional view showing a detail of the engine compartment having a sixth embodiment of the invention.
Figure 10:
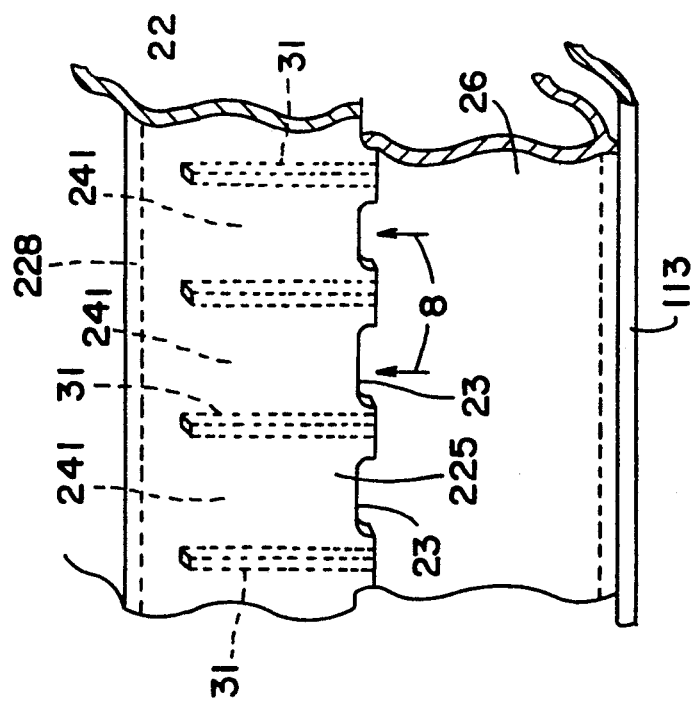
FIG. 10 is a fragmentary side perspective view showing a detail of the body panel and the oil tank in Embodiment 6.

A plurality of vertical partitions which act as cooling fins may be provided on the back surface of the vertical body panel which faces the oil tank, by which a plurality of vertical air passages are formed between the respective partitions, and thus between the oil tank and the body panel as FIGS. 9 and 10 show. By this the air passage is divided into many parts to cool the side wall of the oil tank more uniformly, as well as to effectively increase the tank surface area to be cooled.

Figure 11:
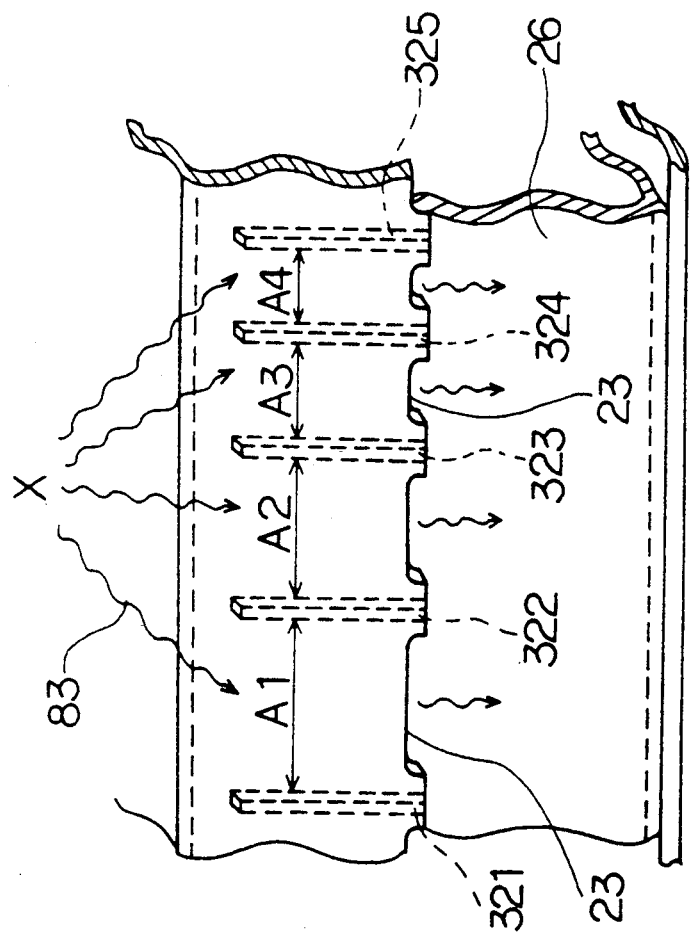
FIG. 11 is a similar fragmentary perspective view showing a detail of the body panel and the oil tank in a seventh embodiment of the invention.
Figure 12:
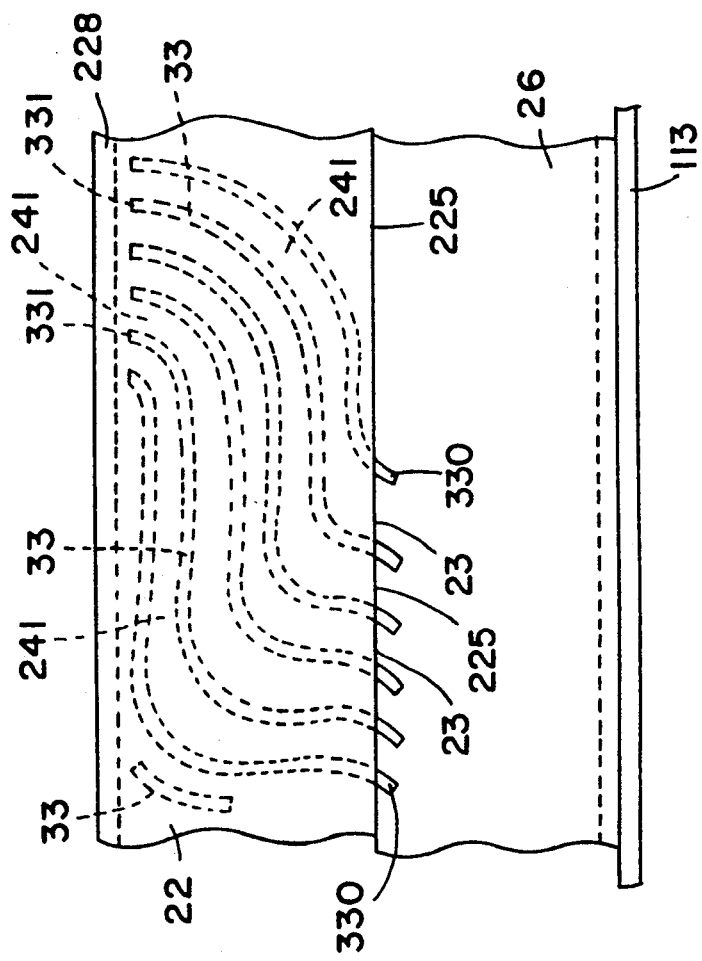
FIG. 12 is a fragmentary side elevational view showing a detail of the body panel and the oil tank in an eighth embodiment of the invention.
Figure 16:
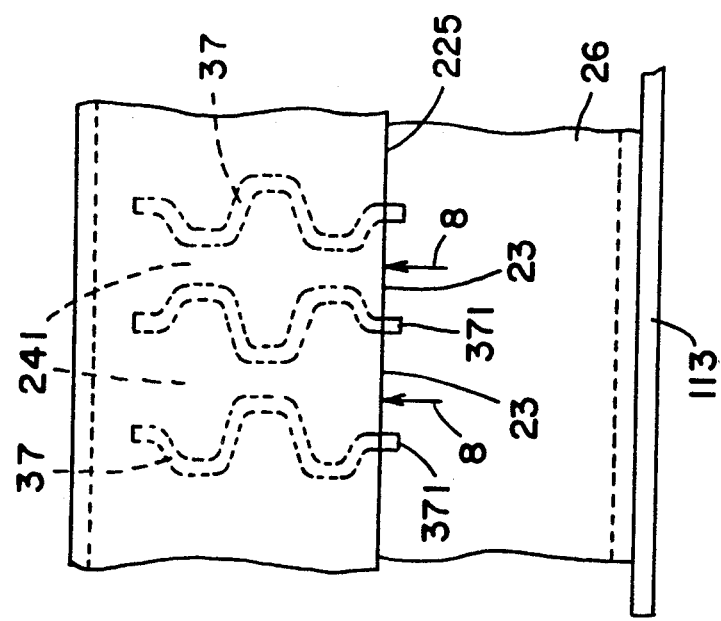
FIG. 16 is a fragmentary side elevational view showing a detail of the body panel and the oil tank in Embodiment 10.

The width (port width) between partitions may be varied in order to further improve the noise suppressing effect as FIG. 11 shows. The partitions may be formed in curved or corrugated configuration to further enhance the cooling effect on the oil tank as FIGS. 12 and 16 show.

Figure 13:
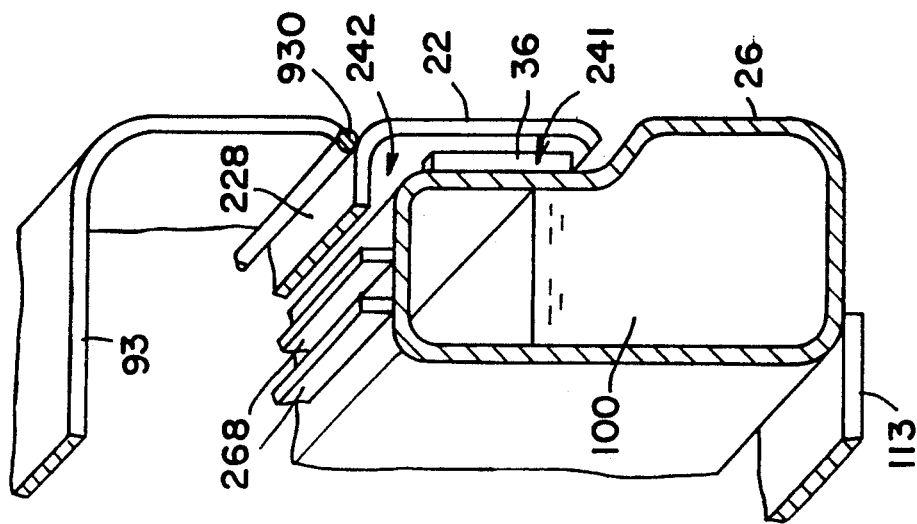
FIG. 13 is a fragmentary rear perspective view showing a detail of the body panel and the oil tank in a ninth embodiment of the invention.
Figure 14:
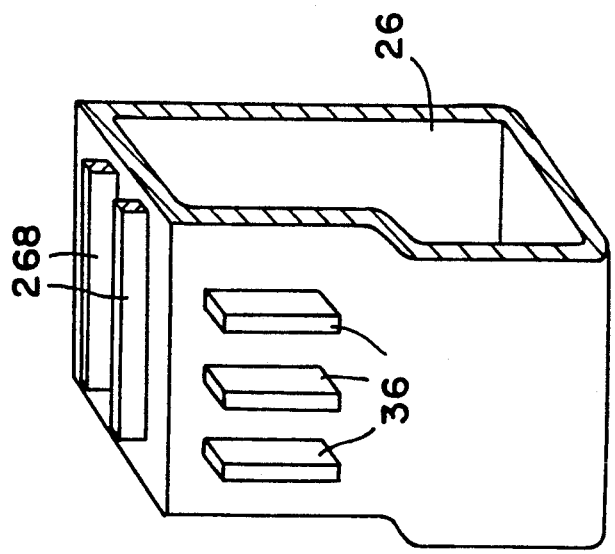
FIG. 14 is a fragmentary side perspective view showing a detail of he oil tank in Embodiment 9.

The partitions may be disposed on the side wall of the oil tank facing the body panel as FIGS. 13 and 14 show. Since the partitions are fixed and in direct contact with the side wall surface of the oil tank, the cooling effect is further increased. One or more cooling fins may be disposed on the top wall surface of the oil tank, by which the cooling effect is increased.

Figure 18:
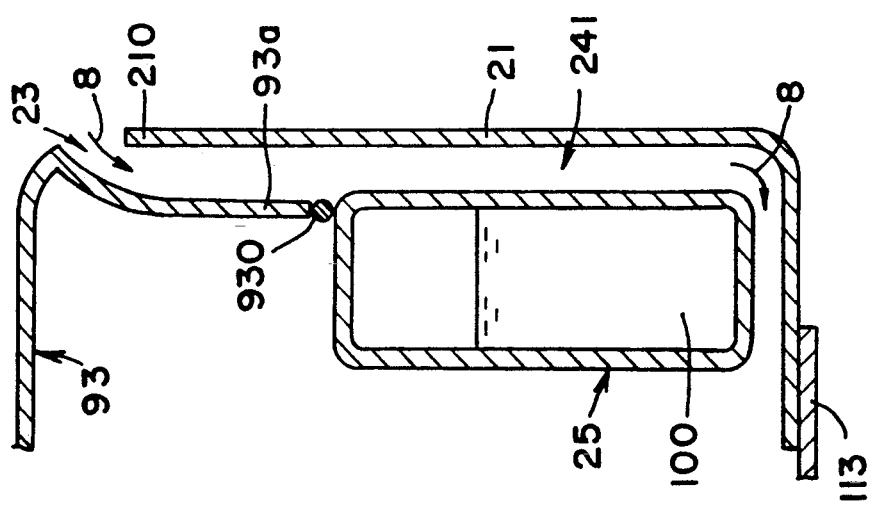
FIG. 18 is a fragmentary rear sectional view showing a detail of the engine compartment in a twelfth embodiment of the invention.
Figure 20:
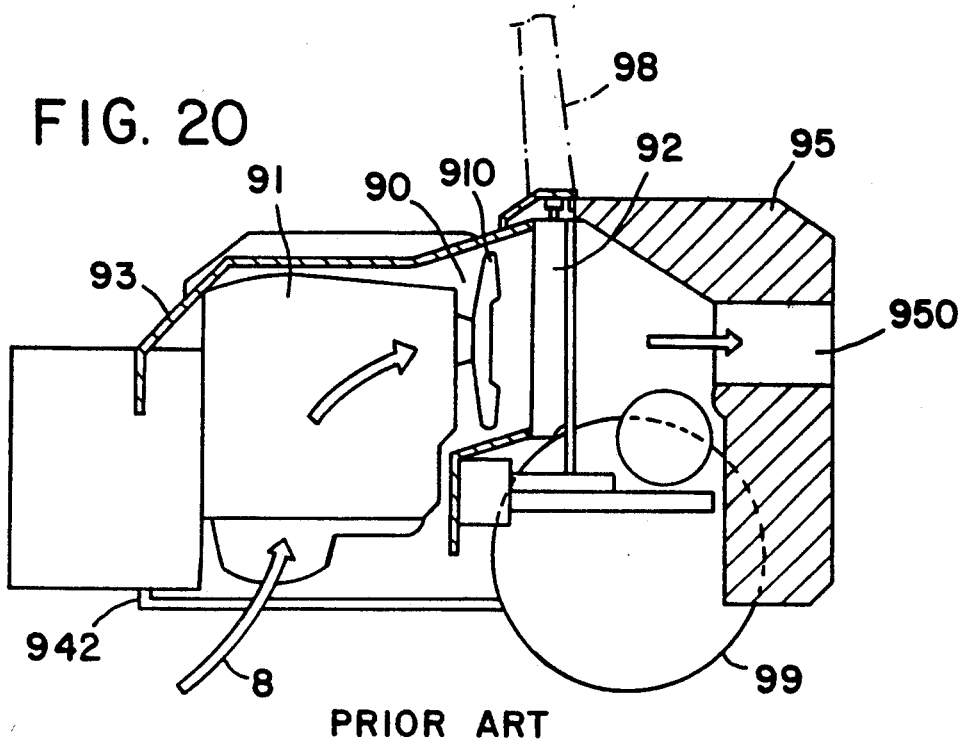
FIG. 20 is a fragmentary sectional side elevational view of an engine compartment of a conventional fork-lift truck.

The noise-proof bottom plate may engage and seal the bottom of the engine compartment, whereupon the cooling air passages may be formed continuously between the vertically extending truck frame and the adjacent vertical side wall surface of the oil tank and between the lower part of the trunk frame and the bottom of the oil tank. As FIG. 18 shows, an intake port communicating with those air passages is provided between the top end of the frame and the engine hood. Since the air passage is made longer, the cooling of the oil tank is further improved.

Figure 19:
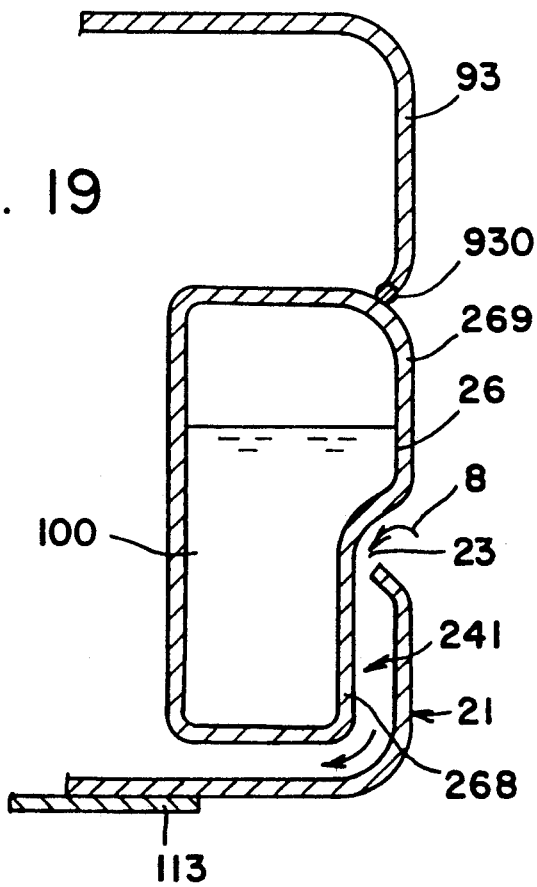
FIG. 19 is a fragmentary rear sectional view showing a detail of the engine compartment in a thirteenth embodiment of the invention.
Figure 21:
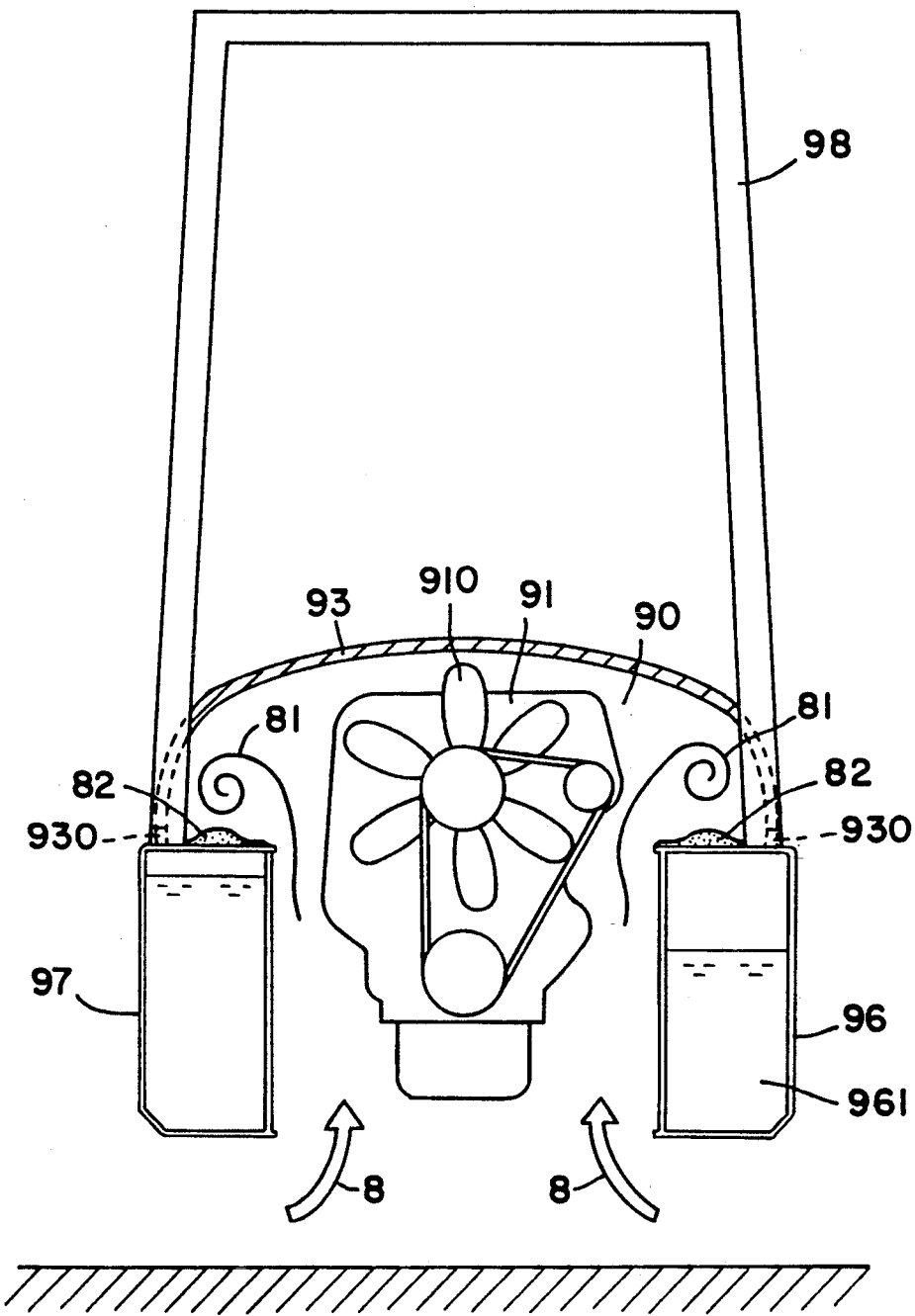
FIG. 21 is a fragmentary sectional rear elevational view showing the engine compartment of the conventional fork-lift truck of FIG. 20.

As FIG. 19 shows, a frame panel can be provided parallel to only the bottom and lower parts of the side wall surface of the oil tank to form an air passage therebetween. The lower end of the frame is shown engaged with the noise-proof bottom plate so as to close the engine compartment bottom.

The noise-proof bottom plate is disposed under the engine compartment. The air passage for cooling the oil tank may be formed between the noise-proof bottom plate and the bottom of the oil tank. It is preferable to provide a noise absorbing member between the bottom of the oil tank and the inner surface of the noise-proof bottom plate.

In the present invention, when starting the engine of the fork-lift truck, the air is drawn in by the engine fan through the intake port, and is then introduced into the engine compartment through the air passage along the wall surface of the oil tank.

In the course of such introduction, the introduced air will take heat away from the wall surface of the oil tank to be cooled. Since the air is introduced from the side of the truck body, road dust is prevented from entering into the engine compartment. Moreover the bottom part of the engine compartment is sealed with a noise-proof bottom plate, which suppresses noise emissions.

The present invention thus provides an engine compartment of a fork-lift truck wherein an adjacent oil tank is sufficiently cooled, and dust and noise are prevented from entering and leaking, respectively.

DESCRIPTION OF PREFERRED EMBODIMENTS

Embodiment 1

A first embodiment of the engine compartment of the fork-lift truck according to the present invention will be described with reference to FIGS. 1 and 3.

An engine compartment 10 of this embodiment is shielded at its bottom 10a by means of a noise-proof bottom plate 113. Air passages 140 and 150 are formed so as to reach the engine compartment 10 along respective top and bottom wall surfaces 111a and 111b of an oil tank 111, the air passages extending between intake ports 14 and 15 formed in the trunk body side and the engine compartment 10. The fork-lift truck of this embodiment comprises a frame 11 and a body 12 mounted thereon, a rubber gasket 13 being mounted therebetween to minimize vibration on the operator. The frame 11 comprises the oil tank 111, fuel tank 112, and respective front and rear endwalls (not shown). The oil tank 111 is welded between the front and rear endwalls of the frame (not shown), as will be understood. The body 12 comprises respective opposite side body panels 121 and a head guard 122 integrally formed therewith. The body panel 121 houses the battery, and hydraulic piping therein (not shown).

The noise-proof bottom plate 113 is integrally formed with the bottom plate of the fuel tank 112 and extends transversely across the underside of the vehicle body 12. The otherwise open bottom 10a of the engine compartment 10 is substantially sealed by the noise-proof bottom plate 113.

The intake port 14 is formed between the noise-proof bottom plate 113 and the bottom wall surface 111b of the oil tank 111. A second intake port 15 is formed between the upper wall surface 111a of the oil tank 111 and the body panel 121.

The air passage 140 extends laterally from the port 14 between the noise-proof bottom plate 113 and the oil tank 111 and into the engine compartment 10. The air passage 150 extends laterally from the port 15 between the upper surface 111a of the oil tank 111 and a lower wall surface 1210 of the body panel 121 and into the compartment 10.

Figure 2:
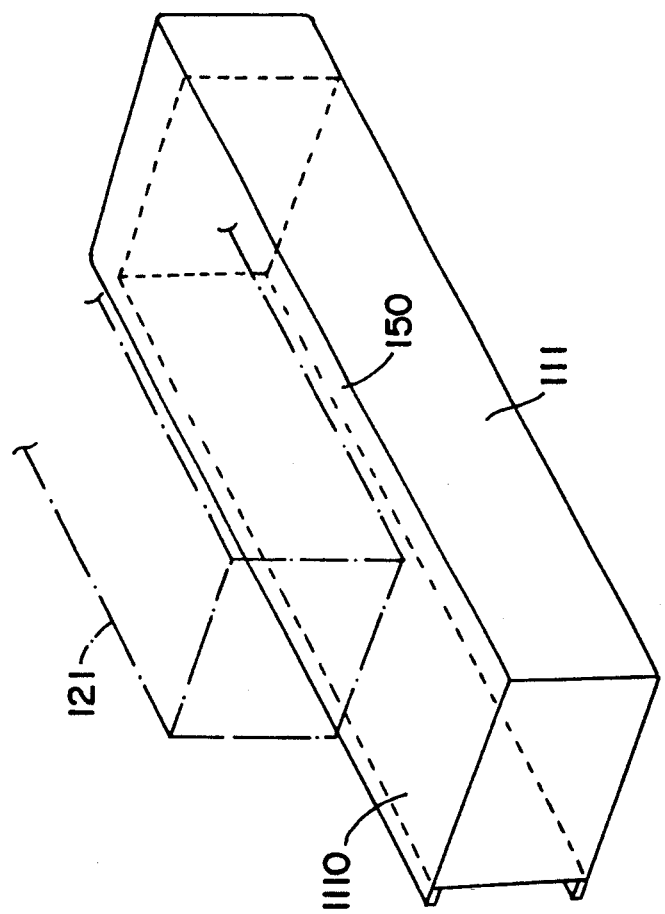
FIG. 2 is a fragmentary perspective view of the oil tank of the fork-lift truck in Embodiment 1.

The oil tank 111 is horizontally elongated in the fore and aft direction of the truck, and has uniform cross section as shown in FIG. 2. An open step 1110 (FIG. 2) is formed on the upper wall surface 111a of the oil tank 111.

Figure 3:
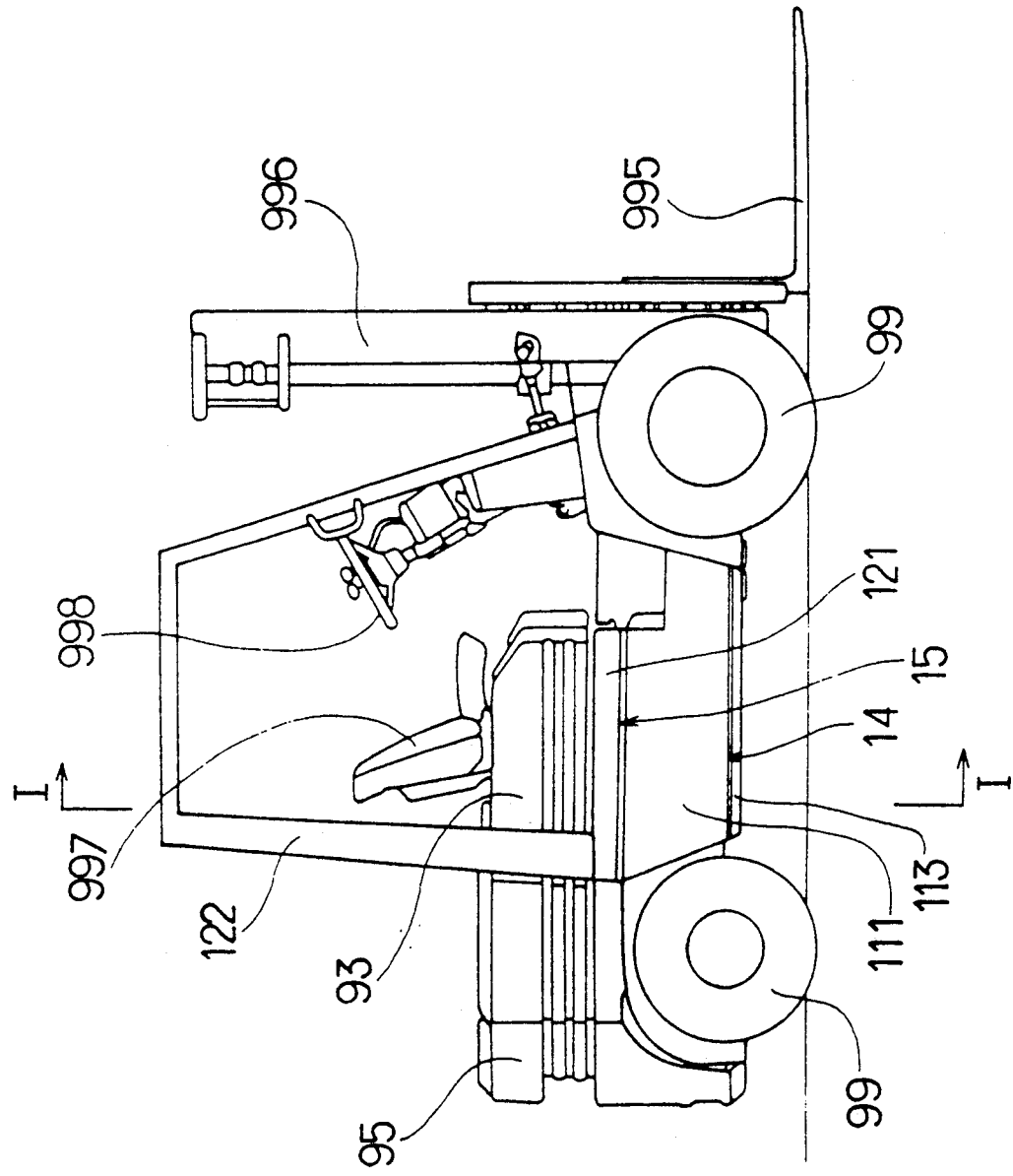
FIG. 3 is a side elevational view of the fork-lift truck in Embodiment 1.

The FIG. 3 which shows a side elevational view of the fork-lift truck, under the engine hood 93 the intake port 15 is formed between the body panel 121, and the intake port 14 is formed between the oil tank 111 and the noise-proof bottom plate 113. Reference numbers 995, 996, 997, 998 and 95 of FIG. 3 designate a fork, a lifting mast, a driver's seat, a steering wheel, and a weight, respectively.

Reference numerals 100, 105, and 13 in FIG. 1 designate hydraulic working oil, fuel, and a rubber gasket respectively. Other constructions are generally the same as those of the prior art.

When starting the engine 91, a flow of outside air 8 by which the radiator is cooled is generated by a cooling fan 910, as shown by the arrows in FIG. 1.

At this time, the outside air 8 is admitted through the intake ports 14 and 15 formed below and above the oil tank 111 as FIG. 1 shows. Then the air 8 is introduced through the air passages 140 and 150 formed below and above the wall surfaces of the oil tank 111 into the engine compartment 10. The introduced air 8 will remove heat from the lower and upper wall surfaces 111b and 111a of the oil tank 111 so that it will be cooled uniformly. Accordingly, the working oil 100 in the oil tank 111 is sufficiently cooled, thus preventing the working oil from overheating. The clearance between the fuel tank 112 and the body panel 121 is sealed by means of the longitudinally extending sealing gasket 13 to increase the amount of air admitted through the ports 14 and 15 at the opposite side of the oil tank 111, resulting in more efficient cooling of the oil tank 111.

The bottom part of the engine compartment 10 is closed by the noise-proof bottom plate 113 so that the outside air 8 is admitted to the compartment 10 only from the side of the truck body through the respective intake ports 14 and 15. This will prevent the dust on the ground from entering into the engine compartment 10. Since the engine compartment 10 is substantially sealed by the noise-proof bottom plate 113, engine noise will not be easily emitted.

Figure 22:
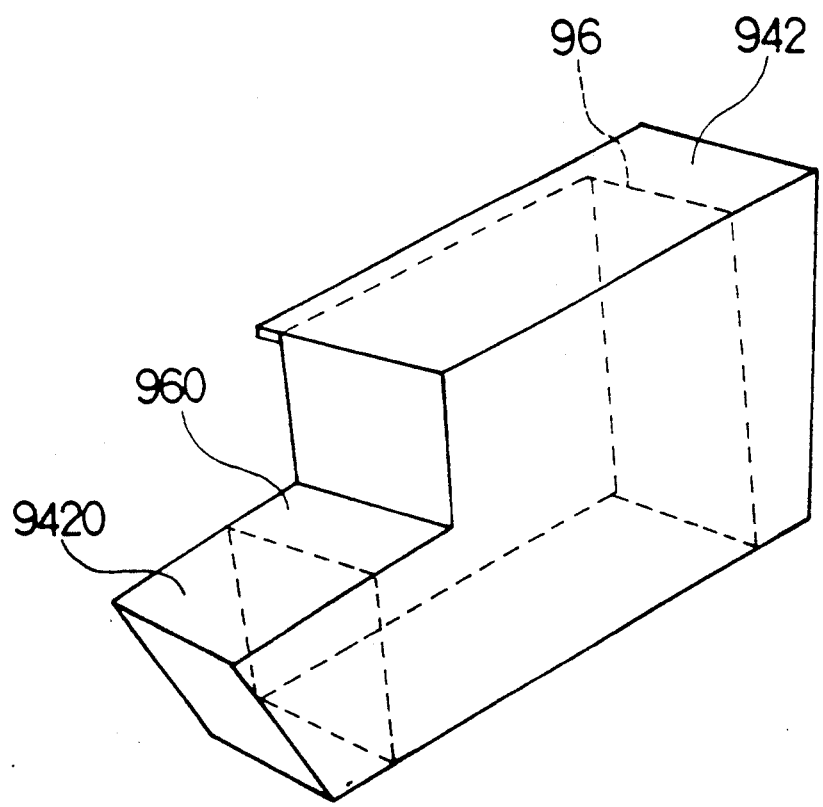
FIG. 22 is a fragmentary perspective view of the oil tank of the conventional fork-lift truck of FIG. 20.

When the oil tank 111 is horizontally elongated with uniform cross section, as FIG. 2 shows, there is no need to provide a recessed portion of the oil tank to accomodate an open step 9420 as is required in the conventional fork-lift truck as shown in FIG. 22. This results in increased tank capacity. Additionally, the center of gravity of the oil tank is lowered, so the fork-lift truck becomes more stable.

Embodiment 2

An engine compartment of the second embodiment will be described with reference to FIG. 4.

In an engine compartment 20, an oil tank 25 is spaced and separated from the body frame 21. Both the frame 21 and a body panel 22 are provided outside the oil tank 25. Air passages 241 and 242 are formed between the outer side wall 25a of the oil tank 25 and the body panel 22.

The frame 21 is disposed as a lower panel around the bottom and side parts of the elongated oil tank 25. The lower end of the frame 21 is bonded to the noise-proof bottom plate 113, substantially sealing the engine compartment 20.

The top end of the frame 21 is bent toward the oil tank 25, forming a gentle curve.

A body panel 22 is provided as an upper cover over the oil tank 25 with a clearance formed therebetween. An intake port 23 is formed between the lower end of the body panel 22 and the top end of the frame 21. The top end 228 of the body panel 22 is bent toward the inside of the engine compartment to parallel the top surface of the oil tank 25. The air passage 241 is formed between the outer side wall surface of the oil tank 25 and inner wall surface of the body panel 22. The air passage 242 is formed between the top wall surface of the oil tank 25 and top end 228 of the panel 22.

The other component parts of Embodiment 2 are the same as those in Embodiment 1.

Since the engine compartment 20 of this embodiment is constructed as described above, after being admitted through the intake port 23 the outside air 8 is introduced into the engine compartment 20 through the air passages 241 and 242. At this time, the cool outside air 8 will remove heat from the side and top wall surfaces of the oil tank 25. The outside air 8 is directed upwardly from the intake port 23 and introduced into the engine compartment through the air passage 241 formed between the oil tank 25 and the frame 21. Flow of air through the air passage 243 is induced by the flow through the air passage 241, resulting in cooling of the bottom part of the oil tank 25.

As aforementioned, the outside air 8 removes heat from side and top wall surfaces of the oil tank 25, resulting in increased cooling, as well as providing the beneficial effects as in Embodiment 1.

In this embodiment, the intake port 23 is formed at a location halfway up the height of the oil tank 25 from its bottom. However, the port 23 need not necessarily be formed at this position. The lower the position of the intake port 23, the better the cooling effect that is obtained.

A plurality of intake ports may be provided.

Embodiment 3

As FIG. 5 shows, an engine compartment 20 of this embodiment uses an oil tank 26 partially forming the frame 21 of the vehicle body, instead of a separate oil tank 25 of Embodiment 2.

An outer side wall 261 of the oil tank 26 partially forms the frame 21. Otherwise the components are the same as those of Embodiment 2.

The oil tank 26 is partially exposed to the outside, by which the cooling effect on the working oil 100 is further improved as compared with Embodiment 2. Air passages 241 and 242 are continuously formed between upper side wall 263 and the top wall surface 265 of the oil tank 26, and the body panel 22, respectively. A centerpart 262 of the side wall of the oil tank 26 is formed as a gentle streamline, enabling the outside air 8 to smoothly enter into the air passage 241 through the intake port 23, by which the cooling effect is improved.

The body panel 22 is formed of a synthetic resin, such as fiber reinforced plastic (FRP) or nylon (polyamide resin), which facilitates vibration dampening and permits a range of color variations from which the color of the body panel 22 may be selected. The resin also provides an excellent appearance. The body panel 22 is preferably easily mounted and dismounted. Also, the same beneficial effects as in Embodiment 2 can be obtained.

Embodiment 4

Figure 6:
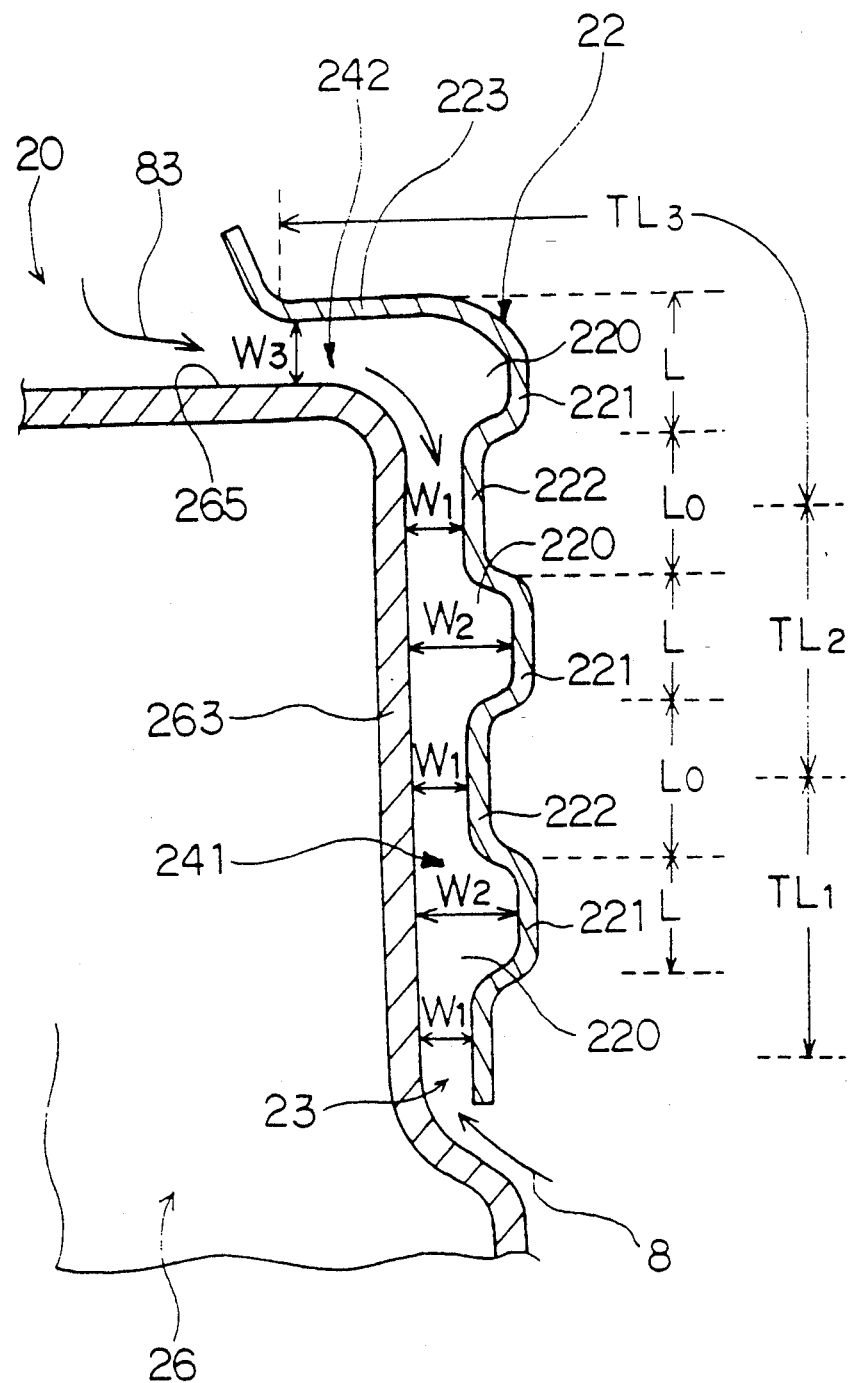
FIG. 6 is a similar fragmentary rear elevational view showing a detail of the engine compartment provided with a fourth embodiment of the invention.
Figure 7:
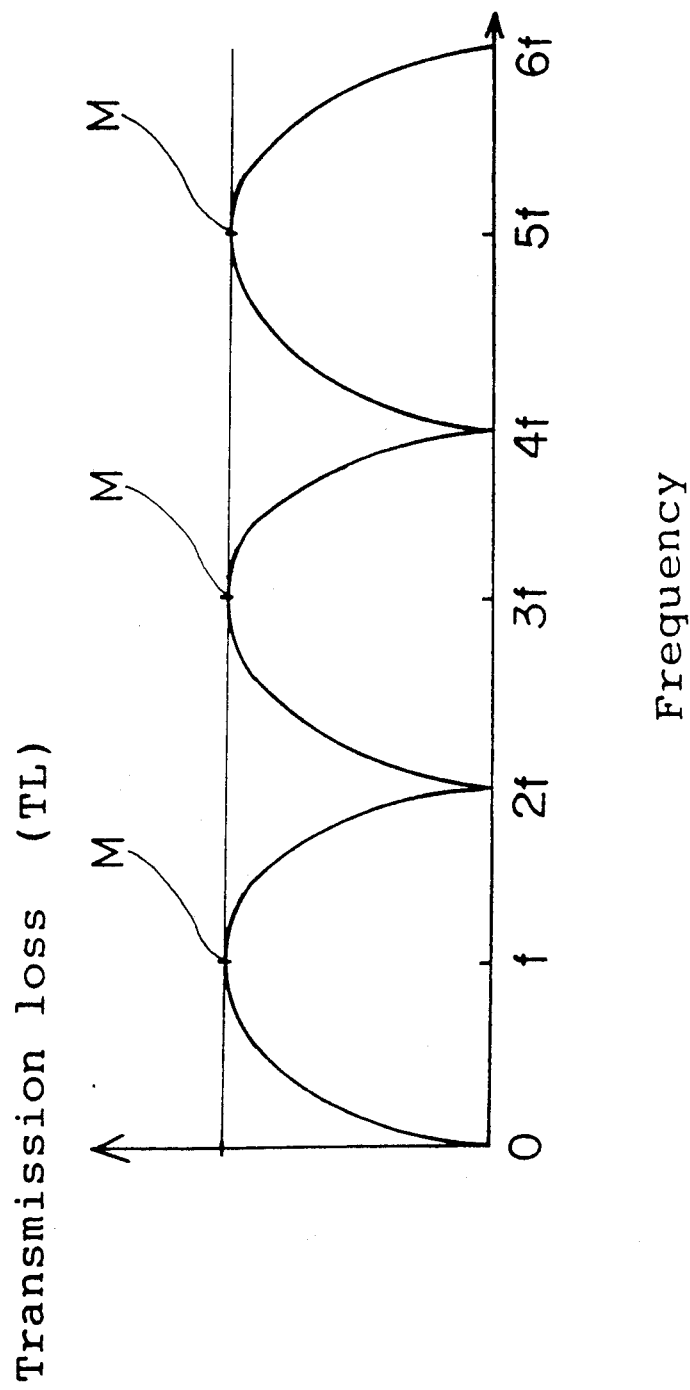
FIG. 7 is a graph showing the relationship between noise transmission loss (TL) and frequency in Embodiment 4.

As FIGS. 6 and 7 show, an engine compartment 20 of this embodiment uses a body panel 22 having corrugations instead of using the generally flat body panel 22 of Embodiment 3. An air passage 241 is formed between the upper side wall 263 of the oil tank 26 and the body panel 22. Otherwise the structure is like that of Embodiment 3.

The body panel 22 comprises a plurality of outward projections 221 whose interiors form the recessed portions 220, and flat parts 222 formed between those projections 221.

Each projection 221 has a height L. A clearance W2 is defined between the side wall 263 of the oil tank 26 and each projection 221.

The flat part 222 has a height $L_0$. A clearance W1 is defined between the side wall 263 of the oil tank 26 and each flat part 222. A clearance W3 is defined between the top 265 of the oil tank 26 and the horizontally bent top end 223 of the body panel 22. The width of the clearance W3 is the same as that of W1. Each clearance W1 and W2 extends entirely along the oil tank 26 and the body panel 22.

Since the body panel 22 is corrugated, it provides a noise suppressing effect for suppressing the noise from the engine compartment 20, which suppression is expressed by the following equation: Noise Transmission Loss $TL1 = 10 \log_{10}[1+(m-1/m)^2/4 \sin^2 kL]$ where $m = S1/S2 = (W2/W1) \times (W2'/W1') \approx W2/W1$.

In the above equation, m, S, W1, W2 designate an expansion ratio, cross-sectional area, and the clearances W1, W2, respectively. Each reference character W1' and W2' designates the horizontal extent of W1' and W2' which is uniformly and sufficiently long enough. The reference character k is expressed by:

$$k = 2\pi f/c,$$

where c designates the speed of sound in meters per second. The reference character f is expressed by $f = c/4L$. The noise transmission loss reaches maximum at 3f, 5f. The above equations apply if $f = 1.22 \times c/(W2 \times W2')$ or less.

In the case of $L_0 \geq L$ in FIG. 6, the respective noise transmission losses TL2 and TL3 may be expressed similarly, resulting in $TL1 \approx TL2 \approx TL3$. The total noise transmission loss is expressed by:

$$TL_T = 3 \times 10 \log_{10}[1+(m-1/m)^2/4 \sin^2 kL].$$

For example, in the case where the expansion ratio $m = W2/W1 = 2 \sim 3$, this leads to $TLmax \approx (1 \sim 1.5) \times W2/W1$.

FIG. 7 shows TLmax, i.e., the maximum value M of the transmission loss TL.

As this FIGURE shows, at the maximum value point M, the noise out of the engine is suppressed to a minimum, resulting in maximum noise suppressing effect. The noise of the engine becomes larger particularly in the range from 500 to 2000 Hz.

The greatest noise emissions are from the noise wave 83 (FIG. 6) at a specific frequency. The maximum value M is obtained by multiplying the frequency by an odd number. The transmission loss in the vicinity of the maximum value M may provide an excellent noise suppressing effect. Accordingly, designing the clearances W1, W2 and the lengths L and L0 according to the type of engine in use may provide an excellent noise suppressing effect.

Since the body panel 22 is corrugated, the noise wave 83 out of the engine compartment 20 is sufficiently suppressed, resulting in significant reduction of the noise level outside the truck. At the same time, the outside air 8 for cooling can be smoothly admitted into the engine compartment through the air passages 241 and 242 in the same way as in Embodiment 3. This embodiment, thus, produces a larger reduction in the amount of noise emitted from the engine compartment 20 as compared with Embodiment 3. The same beneficial effects as those of Embodiment 3 can be obtained.

Embodiment 5

As FIG. 8 shows, this embodiment has a body panel 22 with its lower end extending to the level of the bottom of the oil tank 25 in the engine compartment of Embodiment 2 (FIG. 4). An intake port 23 is formed between a lower end 225 of the body panel 22 and the outer end of the bottom wall 252 of the oil tank 25. Air passages 241 and 242 are formed between the oil tank 25 and the body panel 22. A dust proof filter 226 is disposed in the lower part of the air passage 241 and extends along the length of the truck body side.

The bottom 252 of the oil tank 25 is exposed to the outside air 8 between the body panel 22 and the noise-proof bottom plate 113. Other components of this embodiment are the same as those of Embodiment 2. In this embodiment, the air passages 241 and 242 are extended vertically and horizontally, respectively, resulting in a high cooling effect on the oil tank 25, as well as the same effects as in Embodiment 2.

Embodiment 6

As FIGS. 9 and 10 show, in the engine compartment of Embodiment 3 (FIG. 5) a plurality of partitions 31 are provided between the body panel 22 and the oil tank 26, and the air passages 241 are formed between the respective partitions 31.

As FIG. 10 shows, an intake port 23 is formed between the lower end 225 of the body panel 22 and each partition 31. Each partition 31 is welded in fixed position on the body panel 22. Other structural components are the same as in Embodiment 3.

In this embodiment, the outside air 8 is admitted from the intake port 23 to flow upwardly through the air passages 241 and along the partitions 31. Since the intake port 23 and the air passage 241 are divided into a plurality of parts, the admitted outside air 8 is uniformly in contact with the wall surface of the oil tank 26. The cooling effect on the oil tank 26 is thus improved, and otherwise the same effects as in Embodiment 3 are obtained.

Embodiment 7

As FIG. 11 shows, in this embodiment the interval formed between successive partitions, i.e., the port width, as compared with those intervals in Embodiment 6 (FIGS. 9, 10) is varied. Partitions 321, 322, 323, 324 and 325 are so arranged as to reduce respective port widths A1, A2, A3, and A4 successively. These partitions 321 to 325 have different port widths according to the frequency of the noise wave 83 leaking out of the engine compartment. For example, the large port width A1 functions to suppress the noise wave 83 at low frequency, such as 1 kHz or lower, and the small port width A4 functions to suppress the noise wave 83 at high frequency such as 1 kHz or higher.

The port width of each partition 321 to 325 is varied depending upon the frequency of the normal noise wave 83 caused by the particular engine in use. Other structural members are the same as those of Embodiment 6. This embodiment provides an excellent effect of suppressing the noise from the engine compartment as well as the same other beneficial effects as in Embodiment 6.

Embodiment 8

As FIG. 12 shows, a plurality of partitions 33 like those of Embodiment 6 (FIGS. 9, 10) but curved, are provided. These partitions 33 are welded on, so as to be fixed to the inner side surface of the body panel 22. The lower end 330 of each partition 33 extends downwardly below the lower end 225 of the body panel 22. The upper ends 331 of all of the partitions 33 approach each other in the upper right hand direction at regular intervals.

Air passages 241 are respectively formed between each of the respective partitions 33 and extend partially along the length of the oil tank 26. Other structural components are the same as those of Embodiment 6.

In this embodiment, the air passages 241 are provided in the horizontal direction with respect to the oil tank 26, resulting in longer air passages than those in Embodiment 6.

Accordingly this embodiment provides for further excellent cooling effects as compared with Embodiment 6. Since the lower end 330 of the partitions 33 project below the lower end 225 of the body panel 22, the outside air is easily admitted. The curved partitions 33 facilitate the noise suppressing function. The partitions 33 are fixedly welded to the inner side surface of the body panel 22 over a wide area, resulting in reinforcing of the body panel 22. The same beneficial effects as in Embodiment 6 can be obtained.

Embodiment 9

As FIGS. 13 and 14 show, in this embodiment partitions are provided on the oil tank 26 as in Embodiment 6 (FIGS. 9, 10), and radiation fins 268 are provided on the top surface of the oil tank 26.

The partitions 36 of this embodiment are fixedly welded to the oil tank 26 at regular intervals (FIG. 14). An intake port 241 is formed between the respective partitions 36 and the oil tank 26, and the body panel 22. A plurality of upstanding radiation fins 268 are welded to the top surface of the oil tank 26.

A plurality of partitions 36 are welded to the wall surface of the oil tank 26 as plates for radiation, facilitating radiation of heat from the oil tank 26. The radiation fins 268 which are welded to the top surface of the oil tank 26, further facilitate radiation. The same beneficial effects as in Embodiment 6 can also be obtained.

Embodiment 10

Figure 15:
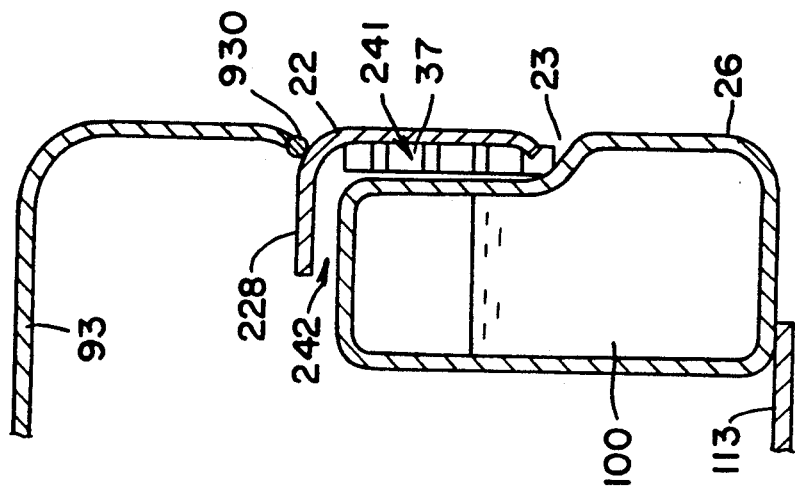
FIG. 15 is a fragmentary rear sectional view showing a detail of the engine compartment in a tenth embodiment of the invention.

As FIGS. 15 and 16 show, the partitions of Embodiment 6 (FIGS. 9, 10) are corrugated in this embodiment. A plurality of corrugated partitions 37 are welded to the inner side surface of the body panel 22. The respective air passages 241 are formed between the partitions 37. The lower end 371 of each partition 37 projects downwardly to below the lower end 225 of the body panel 22.

In this embodiment, the partitions 37 are corrugated, by which an excellent effect of suppressing the noise emanating from the engine compartment can be obtained (See Embodiment 4). The same beneficial effects as in Embodiment 6 can also be obtained.

Embodiment 11

Figure 17:
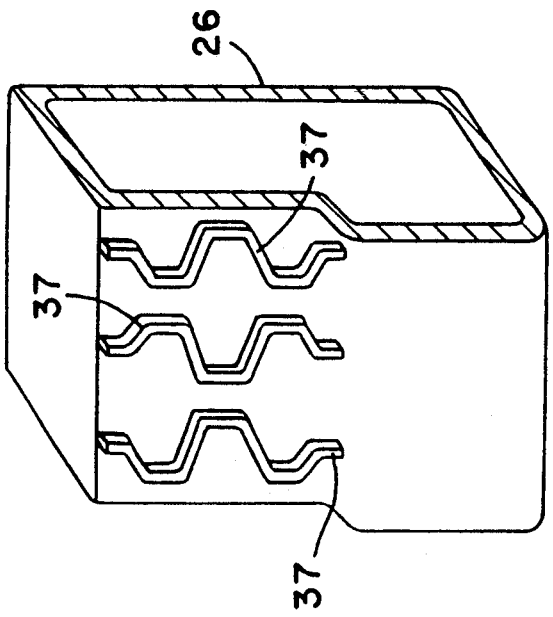
FIG. 17 is a fragmentary side perspective view showing a detail of the body panel and the oil tank in an eleventh embodiment of the invention.

As FIG. 17 shows, the corrugated partitions 37 in Embodiment 10 are fixedly welded to the side of the oil tank 26. Other structural members are the same as those of Embodiment 10.

This embodiment provides the same effects as in Embodiment 10. The partitions 37 are welded to the oil tank 26, further facilitating the heat radiation cooling effect thereof.

Embodiment 12

As FIG. 18 shows, the frame 21 of Embodiment 2 (FIG. 4) can be extended upwardly along the side of the oil tank 25. An intake port 23 is formed between a top end 210 of the frame 21 and the side surface 93a of the engine hood 93. An air passage 241 is formed between the frame 21 and the oil tank 25. The body panel is not used in this embodiment.

The outside air 8 is admitted into the air passage 241 through the intake port 23, then introduced into the engine compartment. In the course of such introduction, the outside air 8 cools the side and bottom parts of the oil tank 25. In this embodiment, the air passage 241 is elongated, resulting in an excellent cooling effect of the air on the oil tank 25. Since the intake port 23 is disposed at an upper position, dust on the ground is kept from entering and clear air is admitted. The same beneficial effects as in Embodiment 2 can also be obtained.

Embodiment 13

As FIG. 19 shows, the shape of the oil tank 26 of Embodiment 3 is inverted. An upper side wall 269 of the oil tank 26 projects out to partially form the frame 21. In this embodiment, the frame 21 also parallels the lower side wall 268 of the oil tank 26. An intake port 23 and an air passage 241 are formed between the frame 21 and the lower side wall 268. The upper part of the oil tank 26 is substantially in contact with the engine hood 93, a noise proof seal 930 being disposed therebetween. The body panel is not used in this embodiment. The same beneficial effects as in Embodiment 3 can be obtained.

While the invention has been described with reference to presently preferred embodiments, it is to be understood that modifications or variations may be made by a person of ordinary skill in the art without departing from the scope of this invention which is defined by the appended claims.

What is claimed is:

1. A fork-lift truck having an internal engine compartment bounded on one side by a tank for hydraulic fluid, said tank having top, bottom and side walls, and said compartment being bounded by additional walls including a bottom plate, the latter shielding said compartment from dust and reducing emission of engine noise, said tank having one of said side walls facing out of said truck on one side of said truck, said truck further comprising:
    means defining a substantially horizontal and horizontally elongated intake port adjacent said hydraulic fluid tank external to said engine compartment on the outside of said truck extending along said one side of said truck in the front-to-back direction along substantially the entire front-to-back length of said tank for admitting outside air; and
    means including at least one of said top, bottom and said one side wall of said hydraulic tank for defining a passage between said intake port defining means and the interior of said engine compartment for conveying outside air from said intake port to the interior of said engine compartment in contact with substantially the entire length of a lengthwise extending wall of said hydraulic fluid tank for cooling said hydraulic fluid in addition to an engine in said engine compartment.

2. A fork-lift truck with an engine compartment as in claim 1, which further comprises a second tank at the side of said engine compartment opposite said one side, said second tank having a bottom wall, and wherein said bottom plate comprises a horizontal extension of said second tank bottom wall towards and alongside the bottom of said hydraulic fluid tank, and spaced vertically from the latter to form said air passage therebetween.

3. A fork-lift truck with an engine compartment as in claim 2, which further comprises a body panel disposed above said hydraulic fluid tank along said one side of said truck and having a lower wall surface spaced above said hydraulic fluid tank to form a second outside air intake port in said one side of said truck and a second air passage communicating with said engine compartment.

4. A fork-lift truck with an engine compartment as in claim 1, wherein said one side wall of said hydraulic fluid tank is at least partially exposed to the exterior of said truck.

5. A fork-lift truck with an engine compartment as in claim 1, wherein said hydraulic fluid tank forms a part of a frame of said truck, and a substantially vertical body panel is provided adjacent to and spaced from said one side of said hydraulic fluid tank to form said air passage therebetween, and said intake port is formed between said body panel and said frame.

6. A fork-lift truck with an engine compartment bounded on one side by a tank for hydraulic fluid, said tank having top, bottom and side walls, and said compartment being bounded by additional walls including a bottom plate, the latter shielding said compartment from dust and reducing emission of engine noise, said tank having one of said side walls facing out of said truck on one side of said truck at least partially exposed to the exterior of said truck, said truck further comprising:
    means defining a substantially horizontal and elongated intake port adjacent said hydraulic fluid tank external to said engine compartment on the outside of said truck extending along said one side of said truck in the front-to-back direction for admitting outside air;
    means including at least one of said top, bottom and said one side wall of said hydraulic tank for defining a passage between said intake port defining means and the interior of said engine compartment for conveying outside air from said intake port to the interior of said engine compartment in contact with a lengthwise extending wall of said hydraulic fluid tank for cooling said hydraulic fluid in addition to an engine in said engine compartment; and
    a body panel provided along an unexposed portion of said one side wall of said hydraulic fluid tank and in spaced relation therefrom to form said air passage therebetween.

7. A fork-lift truck with an engine compartment as in claim 6, wherein said body panel is corrugated with corrugations extending in the longitudinal direction of said truck to provide recess and projection portions of said body panel.

8. A fork-lift truck with an engine compartment as in claim 6, wherein said body panel extends around said bottom wall of said hydraulic fluid tank.

9. A fork-lift truck with an engine compartment as in claim 6, wherein a plurality of partitions are fixed to a back surface of said body panel facing said side wall of said hydraulic fluid tank to form a plurality of said air passages.

10. A fork-lift truck with an engine compartment as in claim 9, wherein the respective spacings between adjacent ones of said partitions are different from each other.

11. A fork-lift truck with an engine compartment as in claim 9, wherein said partitions are curved and are partially aligned with said truck body in a longitudinal direction.

12. A fork-lift truck with an engine compartment as in claim 9, wherein said partitions are corrugated.

13. A fork-lift truck with an engine compartment as in claim 6, wherein a plurality of partitions are fixed to a side wall of said hydraulic fluid tank facing said body panel to form a plurality of said air passages therebetween.

14. A fork-lift truck with an engine compartment as in claim 13, wherein the respective spacings between adjacent ones of said partitions are different from each other.

15. A fork-lift truck with an engine compartment as in claim 13, wherein said partitions are curved and are partially aligned with said vehicle body in a longitudinal direction.

16. A fork-lift truck with an engine compartment as in claim 13, wherein said partitions are corrugated.

17. A fork-lift truck with an engine compartment as in claim 1, wherein said truck further comprises an engine hood covering said engine compartment, and wherein a frame extends adjacent to and spaced from said side wall of said hydraulic fluid tank with said frame having a lower end extending to and engaging said bottom plate and a top end extending upwardly above said tank to adjacent said engine hood, said intake port being formed between said engine hood and said frame, and said spacing between said side wall and said frame defining said air passage.

18. A fork-lift truck with an engine compartment as in claim 1, wherein said bottom plate is fixed to said hydraulic fluid tank to shield the bottom of said engine compartment.

19. A fork-lift truck with an engine compartment as in claim 1, wherein said hydraulic fluid tank has cooling fin means attached thereto.

20. A fork-lift truck with an engine compartment between two side walls of said truck and having a bottom opening, an engine including a fan disposed in said engine compartment, a hydraulic fluid tank adjacent one of said side walls of said truck, said hydraulic fluid tank having top, bottom and opposite side walls, and means defining an exhaust port for exhausting air from the interior to the exterior of said engine compartment, said fork-lift truck comprising:

bottom plate means substantially sealing said bottom opening of said engine compartment;

means providing an air passage on said hydraulic fluid tank side of said truck extending laterally through the corresponding one of said side walls along substantially the entire front-to-back length of said hydraulic fluid tank adjacent at least one wall of said hydraulic fluid tank for admitting air from outside of said truck to said engine compartment thereby cooling said hydraulic fluid tank, said engine fan being disposed to direct said admitted air toward said exhaust port; and said one side wall of said truck has a side body panel adjacent said hydraulic fluid tank, said air passage being formed between said side body panel and said hydraulic fluid tank.

21. A fork-lift truck with an engine compartment as in claim 20, wherein said air passage is formed between said bottom plate means and said bottom walls of said hydraulic fluid tank.

* * * * *

UNITED STATES PATENT AND TRADEMARK OFFICE
CERTIFICATE OF CORRECTION

PATENT NO. : 5,285,863
DATED : February 15, 1994
INVENTOR(S) : O. Miki

It is certified that error appears in the above-indentified patent and that said Letters Patent is hereby corrected as shown below:

Column 2, line 65, "he" should read --the--.

Column 3, line 49, after "panel" insert period --.--.

Column 5, line 40, change "The" to --In--.

Column 13, line 23, delete "with an", and insert --having an--.

Column 14, line 24, change "walls" to --wall--.

Signed and Sealed this

Twenty-seventh Day of September, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,285,863
DATED : February 15, 1994
INVENTOR(S) : Miki

It is certified that error appears in the above-indentified patent and that said Letters Patent is hereby corrected as shown below:

Column 12, line 6, delete "with an", insert —having an internal—.

Signed and Sealed this

Sixth Day of December, 1994

Attest:

BRUCE LEHMAN

Attesting Officer     Commissioner of Patents and Trademarks